United States Patent [19]

Locatelli

[11] 4,363,894
[45] Dec. 14, 1982

[54] GLASS REINFORCED POLYAMIDE COMPOSITIONS HAVING IMPROVED IMPACT STRENGTHS

[75] Inventor: Jean-Louis Locatelli, Vienne, France

[73] Assignee: Rhone-Poulenc Industries, Paris, France

[21] Appl. No.: 213,471

[22] Filed: Dec. 5, 1980

[30] Foreign Application Priority Data

Dec. 10, 1979 [FR] France ............................... 79 30651

[51] Int. Cl.$^3$ ............................................... C08K 3/40
[52] U.S. Cl. .................................... 524/494; 524/514; 524/538; 525/426
[58] Field of Search ...................... 260/37 N; 525/426; 524/494, 514, 538

[56] References Cited

U.S. PATENT DOCUMENTS

| 2,959,565 | 11/1960 | Stanton et al. | 526/426 |
| 3,516,961 | 6/1970 | Robb | 260/37 N |
| 3,962,172 | 6/1976 | Wurmb et al. | 427/407 |
| 3,988,284 | 10/1976 | Wurmb et al. | 526/426 |

FOREIGN PATENT DOCUMENTS 1131533 10/1968 United Kingdom .

OTHER PUBLICATIONS

Kaorce et al., *Chemical Abstract*, vol. 92:50100C, 1980, "Heat Resistance Photo Resists Compositions".

*Primary Examiner*—J. Ziegler
*Attorney, Agent, or Firm*—Burns, Doane, Swecker & Mathis

[57] ABSTRACT

Shaped articles having improved mechanical strengths are comprised of (i) a nylon polyamide resin, (ii) a reinforcing amount of glass fibers therefor, and (iii) an impact strength increasing amount of a (meth)acrylic compound having the structural formula:

$$[CH_2=CR-CO-A]_{\overline{n}}X \qquad (I)$$

wherein R is hydrogen or methyl, n is an integer equal to 2, 3 or 4, A is the linkage —O— or —NH— and X is an organic radical of valency n selected from the group consisting of linear or branched chain alkylene radical having from 1 to 20 carbon atoms, such alkylene radical comprising one or more chain-interrupting oxygen bridges and/or one or more hydroxyl groups, an aralkylene radical wherein the aryl moiety contains from 6 to 10 carbon atoms and the alkylene moiety is as defined above, such aralkylene radical comprising one or more alkylene chain-interrupting oxygen bridges, and a triazino heterocycle.

15 Claims, No Drawings

GLASS REINFORCED POLYAMIDE COMPOSITIONS HAVING IMPROVED IMPACT STRENGTHS

BACKGROUND OF THE INVENTION

1. Field of the Invention

The present invention relates to novel, mechanically improved compositions of matter comprising polyamides and a reinforcing amount of glass fibers therefor, and, more especially, to such compositions comprising an impact strength enhancing amount of a (meth)acrylic derivative.

2. Description of the Prior Art

Unmodified polyamides possess high breaking strengths and are considered to be tough polymers.

When such polyamides are reinforced, for example, with glass fibers, they can be used in numerous applications in which the mechanical properties, in particular at temperatures on the order of 150° to 200° C., must be good.

However, even reinforced, these polyamides are to a certain extent lacking in impact strength.

A considerable number of solutions have been proposed in order to solve this problem, but to date same have proven unsatisfactory; typically, it has been found that improvement in one particular property concomitantly leads to impairment of another given property.

SUMMARY OF THE INVENTION

Accordingly, a major object of the present invention is the provision of mechanically improved glass fiber reinforced polyamido compositions, such improved compositions being characterized in that they comprise at least one compound having the structural formula:

$$[CH_2=CR-CO-A]_{\overline{n}}X \qquad (I)$$

in which R represents a hydrogen atom or a methyl radical, n represents an integer which is equal to at least 2 and preferably equal to 2, 3 or 4, the symbol A represents a linkage —O— or —NH— and the symbol X represents an organic radical of valency n, which can be a linear or branched chain alkylene radical having from 1 to 20 carbon atoms, and which can additionally comprise one or more oxygen bridges and one or more hydroxyl groups, an aralkylene radical (aryl moiety comprising 6 to 10 carbon atoms) which can be branched and which also can contain one or more oxygen bridges, or a nitrogen-containing heterocyclic radical of mono-, di- or tri-substituted triazine type.

DETAILED DESCRIPTION OF THE INVENTION

More particularly according to this invention, exemplary of the several compounds of the formula (I) which are useful in the subject compositions are: acrylic or methacrylic acid derivatives, in particular the acrylic or methacrylic acid esters of polyols, such as the tri(meth)acrylates of trimethylolpropane, the di(meth)acrylates of ethylene glycol, the di(meth)acrylates of hexane-1,6-diol, the di(meth)acrylates of butanediol and the tri- and tetra-(meth)acrylates of pentaerythritol, and the 1,3,5-tris-(meth)acryloyl-hexahydro-S-triazines; in this description, the terms (meth)acrylate and (meth)acryloyl are used to denote both the acrylic acid derivatives and the methacrylic acid derivatives as is common to this art.

In the compositions according to the invention, the proportion by weight of the compounds of the formula (I) advantageously comprises from 0.01 to 10%, and preferably from 0.1 to 5%, of the weight of the mixture of polyamide+glass fibers, with the proportion of the glass fibers comprising from 1 to 50%, and preferably from 10 to 40%, of the weight of the said mixture of polyamide+glass fibers.

By the expression "polyamido composition" or "polyamide-based composition", there are intended compositions in which the major constituent is a polyamide, albeit it is envisaged that other polymers too may be present, provided that they do not fundamentally modify the properties and the behavior of the selected polyamide. Preferred compositions contain from 60 to 100% by weight of polyamide, relative to the total amount by weight of the composition, and more preferably from 80 to 100% by weight. By the term "polyamide", there is intended any semi-crystalline or amorphous polyamide resin having a molecular weight of at least 5,000 and commonly referred to in this art as the nylons. Thus, useful polyamides which can be used in the subject compositions include those described in U.S. Pat. Nos. 2,071,250, 2,071,251, 2,130,523, 2,130,948, 2,241,322, 2,312,966, 2,512,606 and 3,393,210. Such polyamide resins can be prepared by condensing in conventional manner equimolar amounts of a given saturated dicarboxylic acid containing from 4 to 12 carbon atoms, with a given diamine, the diamine containing from 4 to 14 carbon atoms. It is possible to employ an excess of diamine so as to obtain an excess of amine end groups, relative to the carboxyl end groups in the polyamide. Representative examples of polyamides include polyhexamethylene adipamide (nylon-6,6), polyhexamethylene azelamide (nylon-6,9), polyhexamethylene sebacamide (nylon-6,10) and polyhexamethylene dodecanamide (nylon-6,12), polyamides produced by the ring opening of lactams, namely, polycaprolactam and poly-(lauryllactam), poly-(11-aminoundecanoic acid) and poly-bis-(para-aminocyclohexyl)-methane dodecanamide. In the present invention, it is also possible to use polyamides prepared by the copolymerization of two of the above polymers or monomers, or by the terpolymerization of the above polymers or their constituents, for example, a copolymer of adipic acid, isophthalic acid and hexamethylenediamine. Preferably, the polyamides are linear and have a melting point above 200° C.

The compositions according to the invention also contain a reinforcing amount of glass fibers. These glass fibers preferably have a length of between 100μ and 12 mm, with the diameter of the individual filaments typically being between 2 and 20μ. Preference is given to the E-type fibers (as defined in *Handbook of Reinforced Plastics*, published 1964, page 120), with the weight thereof (per kilometer of filament) varying between 600 and 2,500 dtex. Although E fibers are considered to be particularly suitable for the applications for which the compositions according to the invention are intended, it is possible to use other fibers, either alone or in combination with the E fibers. The abovementioned text also reports (pages 121-122) examples of such fibers.

Consistent herewith, treated glass fibers are advantageously incorporated into the subject compositions. On the one hand, these fibers can be constituted into bundles of fibers through use of a binder. Examples of such binders are polyvinyl acetate, copolymers of ethylene and acrylic acid esters, epoxy resins and aromatic polyethers and polyesters. On the other hand, the fibers too can simply be treated with a sizing or coupling agent, such as, for example: organosilicon compounds, such as vinyltri-(ethoxymethoxy)-silane, γ-aminopropyltriethoxysilane, 3-(2-aminoethylamino)propyltrimethoxysilane or vinyl(methacryloyl)trimethoxysilane, or compounds such as complexes of chromium with methacrylic acid.

As above indicated, the essential constituents of the compositions according to the invention are the polyamide, the glass fibers and the compound having the structural formula (I).

In another embodiment of the invention, the subject compositions can contain other substances or ingredients, among which the following are exemplary:

(A) as complementary fillers, pulverulent materials, in particular mica, talc, lithopone or calcined silica, or materials in the form of fibers, in particular carbon fibers, asbestos fibers, quartz fibers, ceramic fibers or other mineral fibers. The proportion of these complementary fillers can reach 30% by weight of the glass fibers; and (B) a compound adapted to assist or enhance the influence of the compound having the formula (I) on the polyamide and/or on the glass fibers. Without wishing to be in any way bound to any particular theory relating to this mode of "assistance", it is thought possible, in the compositions according to the invention, to use catalysts which assist or accelerate the course of any reactions, in particular between the polyamide and the compound having the formula (I); it too being possible for the said reactions to be of the type involving grafting of the compound having the formula (I) onto the polyamide backbone and/or introduction of the compound having the formula (I) into the polyamide chains, and it also being possible for the said reactions to effect crosslinking of the polyamide, depending upon the number of functional groups in the compound having the formula (I) and the reactivity of such groups in the said compound. Examples of catalysts are reported below by way of illustration, although it will be appreciated that those skilled in this art will choose the catalyst, taking into account the known radical process of degradation of the polyamide chains and the reactivity of the ethylenic groups in the compound having the formula (I).

By way of illustration of the abovementioned catalysts, there may thus be mentioned, in particular, peroxygenated compounds, such as 2,5-dimethyl-2,5-di-(t-butylperoxy)-hex-3-yne, dicumyl peroxide, di-t-butyl peroxide, 4,4'-oxy-bis-(triphenylmethyl hydroperoxide), t-butyl hydroperoxide, di-tert.-butyl diperphthalate, t-butyl perbenzoate, t-butyl peracetate, 2,2-bis-t-butyl-peroxybutane, 2,5-dimethyl-2,5-di-(t-butylperoxy)hexane and 1,3-di-t-butylperoxydiisopropylbenzene.

The option of using a catalyst and the choice of the product depend, in particular, on the nature of the compound having the formula (I).

It sill also be appreciated that it is not strictly necessary to incorporate a catalyst in every case where a compound of the formula (I) with acrylic double bonds is included.

Typically, the amount of catalyst incorporated is on the order of 1 to 25%, expressed by weight, relative to the weight of the compound having the formula (I).

The compositions according to the invention can also contain additives incorporated for a specific effect, such as pigments, lubricants, fireproofing agents, stabilizers and agents capable of modifying certain mechanical properties (modulus of elasticity or impact strength). Elastomeric copolymers based on an olefin and acrylic derivatives are mentioned, in particular, as examples of agents of this type.

The subject compositions can be prepared simply by intimately admixing the various constituents. According to a preferred embodiment, the process is carried out in two steps: firstly, the polyamide, the compound having the formula (I) and, if appropriate, the catalyst are mixed, and then, after homogenization of the mixture, the glass fibers and, if appropriate, the other additives mentioned above are introduced while continuing the homogenization operation. If the compound having the formula (I) is liquid, it can be advantageous to combine same with the polyamide in the form of a very dilute solution in a volatile product which is a solvent for the said compound but which is not a solvent for the polyamide. The use of alcohols is particularly advantageous. These operations are typically carried out at ambient temperature (from 15° to 30° C.). The composition prepared in this way can subsequently be molded directly by compression at a temperature between 240° and 290° C. and then granulated and compression-molded or injection molded at a temperature between 240° and 290° C. This technique is normally used because it allows easy processing.

It is also possible to incorporate the additive having the formula (I) into the already molten polyamide. Degradation of the compound introduced is thus prevented from beginning during the melting of the polyamide.

A single-screw or multi-screw extruder equipped with a degassing nozzle can advantageously be used; the additive is introduced into the molten polyamide, in the degassing zone, through a degassing nozzle or through a specially designed orifice.

The shaped articles prepared from the compositions according to the invention possess a combination of valuable properties. They are most notable as regards the flexural and tensile strengths, as well as impact strength.

The methods for determination of these properties are indicated below.

Furthermore, it has also been found that fire resistance, represented, for example, by the limiting oxygen index (LOI), is substantially improved.

Because of these properties, the compositions according to the invention are particularly suitable for the production of components used in the automotive industry (radiators, battery casings and fans), for the manufacture of machining blanks as a replacement for light alloys, and the like.

In order to further illustrate the present invention and the advantages thereof, the following specific examples are given, it being understood that same are intended only as illustrative and in nowise limitative.

EXAMPLES 1 TO 4

A masterbatch was prepared by intimately mixing 100 g of polyhexamethylene adipamide powder and 200 ml of a 10% strength by weight solution, in methanol, of pentaerythritol tetraacrylate having the formula:

$(CH_2=CH-CO-O-CH_2)_4C.$

The methanol was then evaporated off.

Mixtures of a polyhexamethylene adipamide powder having an inherent viscosity of 1.173 dl/g, measured in a 0.5% strength solution in methanol and of the masterbatch prepared as indicated above, and of glass fibers having an average length of about 6 mm, containing γ-aminopropyltriethoxysilane as a coupling agent, were then prepared, by weighing, such as to provide amounts of tetraacrylate of 0.25, 0.5, 1 and 2, expressed in % relative to the total amount of polyamide plus 30% by weight of glass fibers.

After a homogeneous mixture had been obtained under cold conditions, these compositions were introduced into a single-screw extruder, trademark Thoret, having a diameter of 20 mm and a length of 400 mm, and heated to 280° C. Extrusion through the die effected fabrication of a rod which was cooled and then granulated. Utilizing these granules, test-pieces were produced by injection-molding at about 290° C. and under about 400 bars, and these test-pieces were used to measure the flexural strength at 20° C. (in accordance with ASTM Standard Specification No. D 790-63), the flexural modulus at 20° C. (in accordance with ASTM Standard Specification No. D 790-63-distance between supports: 25.4 mm) and the IZOD impact strength at 25° C. on an unnotched test-piece (in accordance with French Standard Specification No. T 51,017).

The results obtained are reported in the Table which follows.

In the case of compositions containing 0.50% of pentaerythritol tetraacrylate, the limiting oxygen index (LOI) was measured in accordance with ASTM Standard Specification D 2863. An LOI index of 28 was determined, which should be compared with an index of 24 for the case of the polyamide by itself.

EXAMPLE 5

The procedure outlined in Example 1 was repeated, but the pentaerythritol tetraacrylate was replaced with 1% of trimethylolpropane triacrylate.

The results obtained are also reported in the Table which follows.

EXAMPLE 6

The procedure outlined in Example 1 was repeated, but the pentaerythritol tetraacrylate was replaced with 1% of butane-1,4-diol diacrylate.

The results obtained are also reported in the Table which follows.

EXAMPLE 7

A powdered composition consisting of polyhexamethylenediamine containing 30% by weight of glass fibers as a reinforcing filler was introduced into an extruder of the same type as that used in Example 1.

An amount of pentaerythritol tetraacrylate which approximately corresponded to 1% by weight of the composition introduced into the extruder was next introduced therein, using a syringe heated to 40° C., through the degassing orifice which corresponded, in the barrel of the extruder, to a melting zone heated to 285° C. This provided a rod which was next granulated, and the granules were used to produce test-pieces intended for the various measurements.

The results reported in the following Table demonstrate that the shorter the residence time of the reactant makes it possible to considerably improve the mechanical properties of the polyamide.

TABLE

| Example | Flexural strength at 20° C. in kg/mm² (a) | Flexural modulus at 21° C. in kg/mm² (b) | Impact strength at 25° C. in kg. cm/cm³ (c) |
|---|---|---|---|
| 1 | 21.1 | 690 | 29.6 |
| 2 | 20.8 | 650 | 30.5 |
| 3 | 20.6 | 660 | 34.1 |
| 4 | 19.9 | 633 | 26.9 |
| 5 | 18.9 | 592 | 27.2 |
| 6 | 18.5 | 557 | 26 |
| 7 | 22.6 | 783 | 28.71 |
| Control | 18.5 | 605 | 21.8 |

The control was prepared by following the procedure described in Example 1, but formulated from a composition comprising only the polyamide and the glass fibers.

(a): ASTM Standard Specification No. D 790-63

(b): ASTM Standard Specification No. D 790-63 (distance between supports: 25.4 mm)

(c): French Standard Specification No. T 51,017 (IZOD impact strength—unnotched test-piece).

It was found that, although the flexural strength was only slightly increased, if at all, and although the flexural modulus changed only slightly, compared with that of the polyamide by itself, the impact strength, on the other hand, was very greatly increased, namely, by as much as 56% in one example and by no less than about 20% in the other examples.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A composition of matter, comprising (i) a polyamide resin, (ii) a reinforcing amount of glass fibers therefor, and (iii) an impact strength increasing amount of a (meth)acrylic compound having the structural formula:

$(CH_2=CR-CO-A)_{\overline{n}}X$ wherein R is hydrogen or methyl, n is an integer equal to 2, 3 or 4, A is the linkage —O— or —NH— and X is an organic radical of valency n selected from the group consisting of linear or branched chain alkylene radical having from 1 to 20 carbon atoms, such alkylene radical comprising one or more chain-interrupting oxygen bridges, one or more hydroxyl groups or one or more of both said oxygen bridges and hydroxyl groups, an aralkylene radical wherein the aryl moiety contains from 6 to 10 carbon atoms and the alkylene moiety is as defined above, such aralkylene radical comprising one or more alkylene chain-interrupting oxygen bridges, and a triazino heterocycle.

2. The composition of matter as defined by claim 1, the compound (I) being selected from the group consisting of tri(meth)acrylate of trimethylolpropane, di(meth)acrylate of ethylene glycol, di(meth)acrylate of hexane-1,6-diol, di(meth)acrylate of butanediol, tri(meth)acrylate of pentaerythritol, tetra(meth)acrylate of pentaerythritol, and 1,3,5-tris-(meth)acryloyl-hexahydro-S-triazine.

3. The composition of matter as defined by claim 1, the compound (I) comprising from about 0.01 to 10% by weight thereof.

4. The composition of matter as defined by claim 3, the compound (I) comprising from about 0.1 to 5% by weight thereof.

5. The composition of matter as defined by claim 3, the glass fibers (ii) comprising from about 1 to 50% by weight of the total weight of the polyamide (i)+glass fibers (ii).

6. The composition of matter as defined by claim 5, the glass fibers (ii) comprising from about 10 to 40% by weight of the total weight of the polyamide (i)+glass fibers (ii).

7. The composition of matter as defined by claim 5, the glass fibers (ii) comprising E-type fibers.

8. The composition of matter as defined by claim 5, the glass fibers (ii) the glass fibers (ii) having been treated with a binder, sizing agent or coupling agent.

9. The composition of matter as defined by claim 1, further comprising a complementary filler material.

10. The composition of matter as defined by claim 1, further comprising a catalyzing amount of a catalyst.

11. The composition of matter as defined by claim 1, further comprising at least one pigment, lubricant, stabilizer, modulus of elasticity modifier, impact strength modifier, or a mixture thereof.

12. The intrareaction product of the composition of matter as defined by claims 1 or 10.

13. A shaped article comprising the composition of matter as defined by claim 1.

14. A shaped article comprising the intrareaction product as defined by claim 12.

15. The composition of matter as defined by claim 1, further comprising at least one fireproofing agent.

* * * * *